United States Patent
Fifer

(10) Patent No.: US 7,580,629 B2
(45) Date of Patent: Aug. 25, 2009

(54) LOS BEAT DETECTOR

(75) Inventor: Vincent Fifer, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 577 days.

(21) Appl. No.: 11/383,338

(22) Filed: May 15, 2006

(65) Prior Publication Data

US 2007/0264025 A1 Nov. 15, 2007

(51) Int. Cl.
*H04B 10/08* (2006.01)
*H04B 17/00* (2006.01)

(52) U.S. Cl. .................. 398/18; 398/155; 375/215; 375/376

(58) Field of Classification Search .............. 398/17, 398/18, 155; 375/215, 376
See application file for complete search history.

(56) References Cited

U.S. PATENT DOCUMENTS

| 4,012,596 A | * | 3/1977 | West et al. .................. 379/442 |
| 7,483,638 B2 | * | 1/2009 | Hayashi ...................... 398/135 |
| 2004/0162039 A1 | * | 8/2004 | Marque-Pucheu .......... 455/126 |
| 2005/0193301 A1 | * | 9/2005 | Partovi et al. ............... 714/727 |

* cited by examiner

*Primary Examiner*—Nathan M Curs
(74) *Attorney, Agent, or Firm*—Jeffrey M. Measures; Borden Ladner Gervais LLP

(57) ABSTRACT

A loss of signal beat detector makes use of multiplication of a local clock signal and a recovered clock signal to obtain frequency deltas used to indicate loss signal. Through a hardware implementation, a high speed detection is offered, allowing changeover from the recovered clocking signal to the local clock signal when loss of signal is detected to prevent the transmission of a timing transient to downstream nodes.

11 Claims, 4 Drawing Sheets

LOS BEAT DETECTOR

FIELD OF THE INVENTION

The present invention relates generally to timing elements in optical networking equipment. More particularly, the present invention relates to detecting a loss of signal in an optical network quickly enough to avoid propagation of a large timing transient.

BACKGROUND OF THE INVENTION

Optical transmission networks are favored in telecommunications due to the increase in bandwidth that they provide in comparison to traditional metal cable networks. Fiber optic channels are used as the transmission medium for optical signals, commonly optical pulse trains. As a transmitted signal propagates, it degrades due to a number of factors including absorption in the fiber channel.

Although amplifiers can be used to address the loss of signal amplitude, they do not aid in maintaining the hard edges of the pulses. The hard edges of the pulses are used by optical elements in a clock recovery process. To ensure that signal degradation does not result in an unrecoverable signal, optical repeaters, also referred to as regenerators, are employed.

Conventional optical repeaters and regenerators are optical-electric-optical (OEO) devices that convert the received optical signal to its electrical counterpart, and then retransmit the signal in an optical form. Error correction can be employed after the conversion to the electrical domain, as can other functions.

In synchronous feed forward network architectures, such as Synchronous Optical Networks (SONET), repeaters rely upon the signal to maintain clocking synchronous to other network nodes. If one element in a network path fails, it should preferably do so in a manner that does not create problems for other elements. Similarly, a system that detects a failure should handle the failure in a manner that prevents the failure condition from being propagated to downstream nodes.

In many synchronous standards, elements such as repeaters have built-in reference clocks. Despite the presence of the reference clocks timing is recovered from the received signal and is fed-forward to the egress port for propagation to downstream network nodes. The use of the feed-forward timing is done to ensure timing consistency across the network.

In conventional synchronous systems such as SONET and Optical Transport Network (OTN) repeaters, failure conditions can occur and have catastrophic results. Fiber interruptions and line cuts, as well as other events causing an unplanned termination of service can result in a loss of signal. Because clocking information is embedded in the signal, a loss of signal eliminates the ability of the clock recovery circuitry to extract an accurate clocking signal. The Clock Data Recovery (CDR) elements will continue to generate a clocking signal, but this signal quickly deviates from the signal extracted from the received signal. This deviation manifests itself as a clocking signal transient. If the clocking signal transient is not suppressed, it will be propagated downstream. Typically the transient will interrupt clock recovery at downstream nodes, which in turn will propagate the timing transient. This propagation of a transient generates a cascade of element failures, with each element passing the failure-inducing transient to the next element. Because these elements often require manual intervention to re-initialize and re-synchronize with the network, it is seen as advantageous to avoid the passing of transients to other network elements. To avoid this, loss of signal conditions must be detected quickly so that a substitute clock can be used in place of the recovered clock. If the change over to the reference clock is done sufficiently quickly, the transient generated by the drifting recovered clock in the CDR is suppressed. Thus, the effect of timing transients will be minimized and will not effect downstream nodes.

When a sudden interruption to a pulse train transmitted on an optical fiber occurs, the receiver clock recovery fails and generates a transient. Without fast detection of a loss of signal, the failure will propagate downstream. Due to the feed forward nature of optical networks, the erroneously derived timing information will be propagated to downstream nodes. Many optical networking standards dictate that loss of signal must be detected and suppressed within a set number of clock cycles. However, no description of how to implement rapid transient detection is provided.

It is, therefore, desirable to provide a system for detecting the loss of signal in an optical network to prevent generation of a timing transient.

SUMMARY OF THE INVENTION

It is an object of the present invention to obviate or mitigate at least one disadvantage of previous optical repeaters and transient detectors.

In a first aspect of the present invention, there is provided a beat detector for indicating drift in a recovered clock signal. The detector comprises a multiplier, a trigger and a window detector, and may also include a filter. The multiplier multiplies the recovered clock signal with a locally generated clock signal. The trigger generates a first output signal when a component of the multiplied clock signals exceeds a threshold, and a second output signal distinct from the first output signal when the component of the multiplied clock signal does not exceed a threshold. The window detector generates a signal indicative of drift in the recovered clock signal when the frequency in change between the first output signal and second output signal of the trigger is outside a predefined window. If implemented, the filter, preferably a low pass filter, filters the multiplied clock signals to provide only the component of the multiplied clock signal compared to the threshold, to the trigger.

In a second aspect of the present invention, the beat detector is implemented in a standard networking element such as an optical repeater or an optical regenerator.

The loss of signal beat detector provides rapid detection of loss of signal by making use of at least one component in a multiplication of the recovered clock signal and a reference clock signal. A low frequency component of the result of the multiplication is a frequency delta between the two clocking signals. This delta can then be examined to determine whether the recovered clock is rapidly diverging from the reference value. If divergence is detected, a signal indicative of the divergence is generated. In optical networking equipment, this signal can be used to switch the ingress clocking signal from the recovered clocking signal to the reference clocking signal.

An implementation in hardware, using a Schmitt trigger and a pulse window detector, allows for a rapid detection and switching to suppress the generation of timing transients. Software solutions implemented in sufficiently fast hardware can also be used to trigger off the frequency deltas obtained from the multiplication of the clocking signals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for detecting loss of signal in optical repeaters and other similar environments using frequency deltas.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a hardware circuit, firmware, or a combination thereof.

Figure 1:
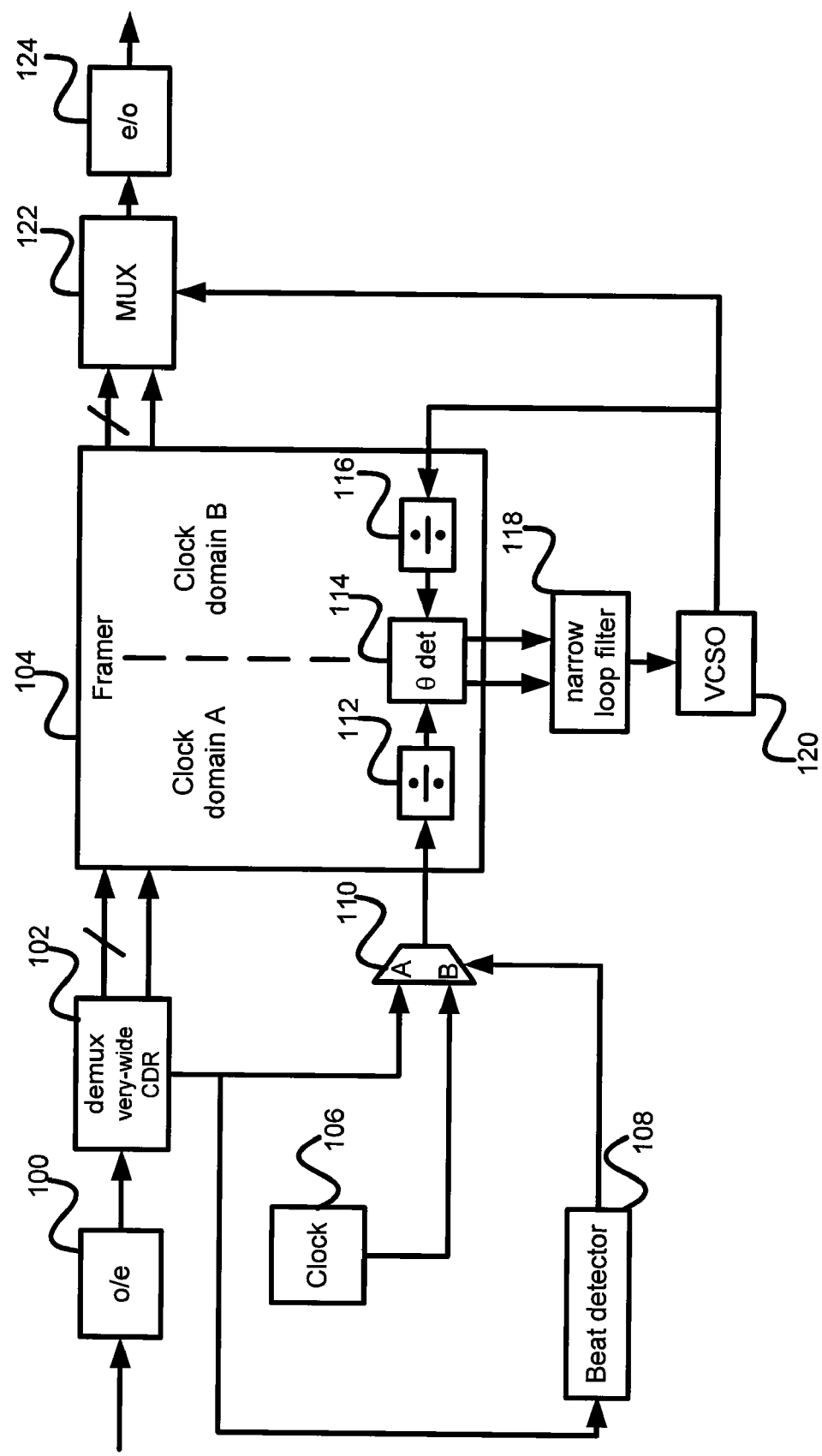
FIG. 1 is a block diagram illustrating a optical repeater having a beat detector.

FIG. 1 presents a block diagram of an optical regenerator. An optical signal is received by optical to electrical converter 100, where it is transferred to the electrical domain. The electrical signal is provided to demultiplexer 120 which has a clock data recovery path with a wide loop bandwidth. The demultiplexed signal is provided to framer 104, which has two clock domains, corresponding to the two sides of the network connected by the repeater. Switch 110 receives as its input the recovered clock signal from demux 102 and from clocking system 106. The switch 110 is controlled by beat detector 108. During the normal course of events, the clock recovered from demux 102 is fed to framer 104 by switch 110. This input is provided to divider 112, which along with divider 116 is the input to phase detector 114. The outputs of the detector 114 are filtered by narrow loop filter 118 and then provided as a control to oscillator 120, which in the illustrated implementation is a voltage controlled saw oscillator (VCSO). The output of framer 104 is provided to multiplexer 112, which receives timing from VCSO 120. The multiplexed electrical signal is then provided to electrical to optical converter 124. The resulting optical signal is then transmitted to the next system in the downstream optical path. Thus, a signal received optically by optical to electrical converter 100 is regenerated and sent out by electrical to optical converter 124 as an optically repeated signal.

Beat detector 108 examines the clocking signal provided by demux 102, and determines whether or not clocking within the operational parameters of the system is being received. Typically this is done by using frequency detection techniques. If a loss of signal occurs, a clocking signal cannot be recovered. CDR functions of demux 102 begin to deviate from the required range. Without a data signal, framer 104 transmits a default signal at the clock rate provided to keep downstream elements synchronized. If demux 102 provides an unacceptable clocking signal, the output of the framer 104 will be multiplexed using the bad clocking signal which results in a clocking transient being propagated downstream. When beat detector 108 determines that the clocking signal is indicative of a loss of signal, it causes switch 110 to change from the recovered clocking signal to a generated clock signal from clock 106. This ensures that the basic signal transmitted by the framer 104 will be synchronized and will not propagate the transient. If this detection is done sufficiently quickly, the clocking signal will not have deviated sufficiently to cause problems in the downstream nodes and the downstream nodes will not lose their synchronization to the network and operator intervention will not be required.

Conventionally, frequency detection has been implemented as a software routine that examines the extracted clocking signal. As is often the case with software routines in high frequency environments, software executed on a conventional hardware platform cannot process the clocking signal sufficiently quickly to detect loss of signal in the clocking signal to prevent generation of a transient. As a result, the clocking is switched too late and the transient is propagated downstream. Attempts have been made to use software embedded in high performance hardware, as well as firmware in an attempt to detect the transient quickly enough to prevent propagation, but these attempts do not often meet the published requirements of SONET standards. This problem has often been linked to the complexity of the algorithm used to detect the transient. These algorithms are often complicated and when implemented often make use of hardware elements such as digital signal processors (DSPs) and field programmable gate arrays (FPGAs). Despite the use of sophisticated elements, these systems rarely, if ever, meet the requirements of the networking standards. Despite this drawback, these systems are implemented as it is often viewed that a partially defective solution is better than no solution at all. Software solutions are typically too slow to detect loss of signal because very often the clocking signal is changing a number of times in the span of a single execution cycle. Thus a number of cycles is required to determine if the signal is within the appropriate clocking window.

Figure 2:
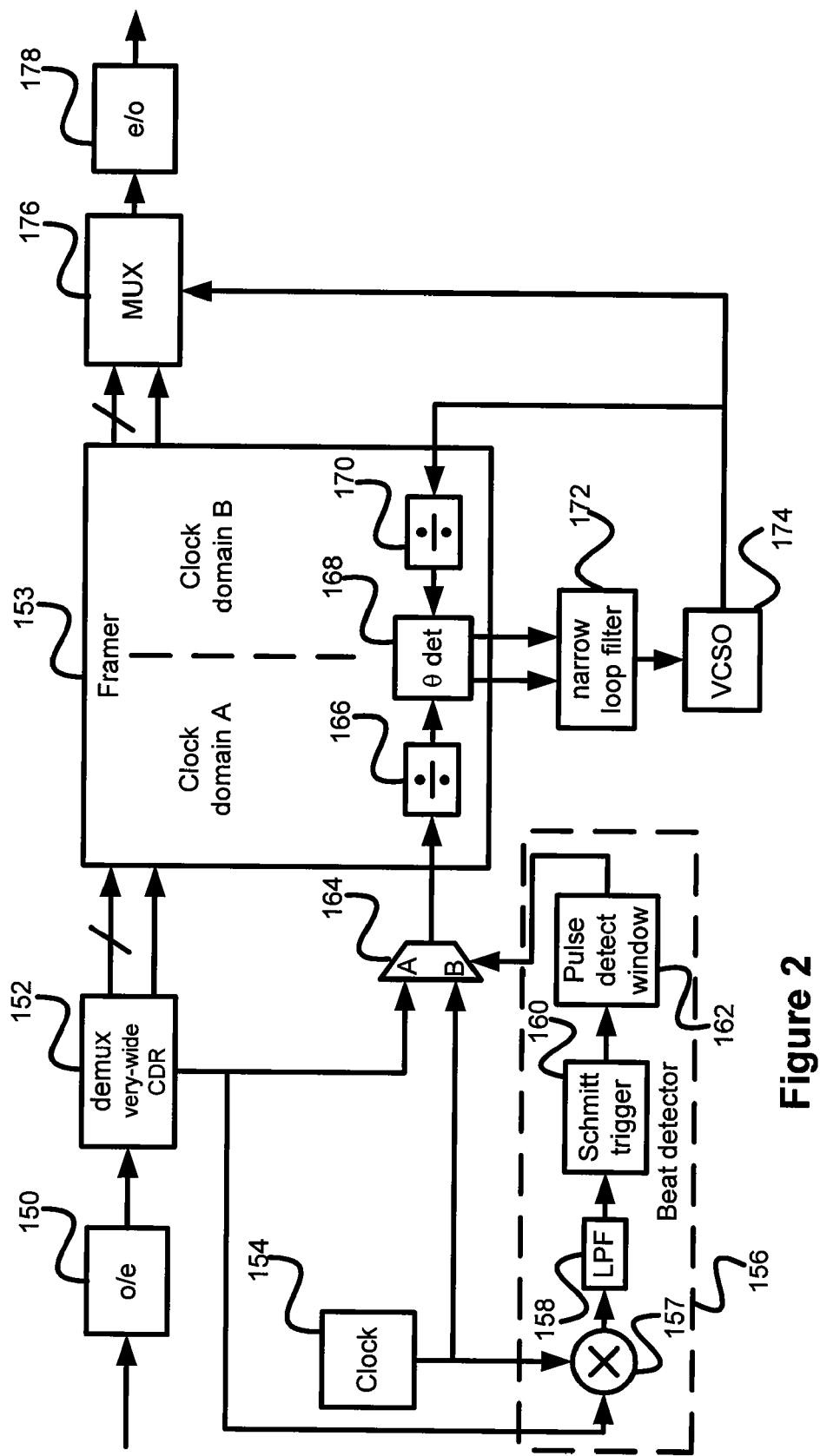
FIG. 2 is a block diagram illustrating an optical repeater having a hardware based beat detector and making use of a free running clock.

FIG. 2 illustrates a repeater/regenerator making use of a hardware implementation of a beat detector. As before, an optical signal is received by optical to electrical converter 150 and is converted to an electrical domain signal. This signal is demultiplexed by demux 152 which also extracts a clocking signal. The demultiplexed signal is provided to framer 153, which reframes the data. Dividers 166 and 170 are used as inputs to phase detector 168. The phase detector output is passed through the narrow loop filter 172 to generate the input to VCSO 174. VCSO 174 determines the clocking of multiplexor 176 which combines the data outputs of framer 153 into a single electrical signal that is then converted to an optical domain signal by electrical to optical converter 178. Divider 170 uses the output of VCSO 174 as its input to ensure that clock domain B of the framer is accurately timed.

The input to divider 166, which ensure that clock domain A of the framer is accurately timed, is provided by switch 164. Switch 164 provides either the clocking signal recovered by demux 152, or the output of clock 154. The control for switch 164 is provided by beat detector 156. Beat detector 156 makes use of a hardware implemented solution to detect the loss of signal.

In a loss of signal scenario, the CDR will begin to deviate from the required frequency. At first, the deviation is not sufficiently large that it will cause problems downstream. However, because there is not signal to synchronize to, the CDR will eventually drift sufficiently far, that all nodes downstream will experience synchronization issues. This is manifested as a transient in the clocking signal, as the distance between the CDR clocking signal and a reference clocking signal will keep increasing. When loss of signal is detected, another clocking signal is immediately switched to. If detection is postponed, the switch will occur after the recovered clock has drifted a considerable distance, and the sharp transition to a more constrained clocking signal will serve as part of the definition of the transient, as the clocking signal will have dramatically shifted. By detecting the loss of signal quickly, and then replacing the CDR generated clocking signal, the size of the transient is contained, effectively suppressing the transient. This prevents the transient from disrupting downstream nodes.

The recovered clocking signal is provided as an input to multiplier 157 as is the clock generated clocking signal. By multiplying the signals together, components of the signals, including first order differences, are obtained. These first order differences are typically low frequency values. When the signals diverge, the first order differences rapidly increase. These delta values allow for easier detection of the loss of signal. By multiplying a steady clocking signal, such as one from clock 154, with the recovered clock signal, changes in the clocking will become more apparent. The output of multiplier 156 is then provided to a low pass filter (LPF) 158. LPF 158 removes high frequency components of the multiplication. This leaves just the low order frequency deltas. The use of LPF 158 is optional as the triggering elements can be designed to be responsive only to low frequency signal components. However, the use of LPF 158 simplifies the implementation of the beat detector 156. A Schmitt trigger 160 is then employed to trigger on the filtered signal. As will be understood by those skilled in the art, Schmitt trigger 160 compares the filtered signal to a threshold. When the signal exceeds the threshold, the Schmitt trigger 160 provides a high output signal, and when the signal does not exceed the threshold, the trigger provides a low output signal. Although other comparators could be employed, Schmitt triggers are simple to implement and their inherent hysteresis serves to further decrease the likelihood of false detection.

Because the output of the Schmitt trigger 160 is one of two defined levels, a simple pulse detection window circuit 162 can be created. The pulse detect window 162 will change its output value if the frequency of the signal received from Schmitt trigger 160 leaves a defined window. If a departure from the defined window is detected by pulse detect window 162, the output signal is changed. The output signal serves as the controller for switch 110. The output associated with having the input to the pulse window detect 162 in the window leaves Framer 153 receiving its clocking signal from the clock recovery function of demux 152. When the input to the pulse window detect 162 is outside of the defined window, its output triggers switch 110 to provide the output of clock 154 as the clocking signal to framer 153.

The combination of the Schmitt trigger 160 and pulse detect window 162 allow detection of the delta between the clocking signals. This allows a determination to be made as to whether the delta is within an acceptable bound. When the delta is outside of the bound the system triggers switch 164 to change inputs. Because a beat detector 156 provides detection based on frequency differences, rapid detection of loss of signal is possible. This allows the switch to the signal of clock 154 to be quickly which effectively suppresses the transient.

Figure 3:
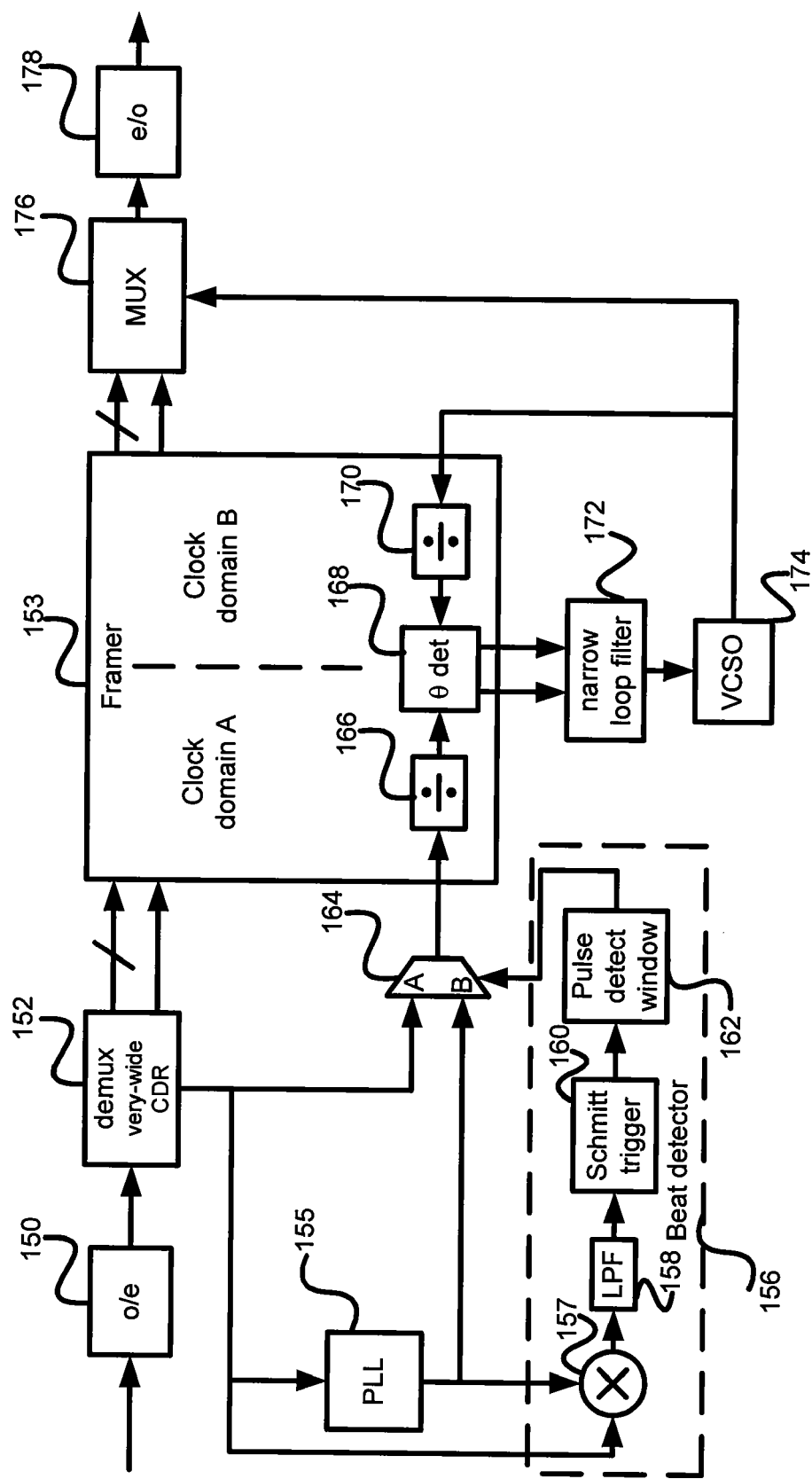
FIG. 3 is a block diagram illustrating an optical repeater having a hardware based beat detector and making use of a PLL for a clock

FIG. 3 illustrates a further implementation of an optical repeater/regenerator. The system is similar to that discussed with reference to FIG. 2, but a phase locked loop (PLL) 155 is substituted for the clock 154. PLL 155 receives as an input the recovered clock signal from demux 152. The PLL 155 provides an alternate clocking signal in place of free running clock 154. One skilled in the art will appreciate that this implementation allows the avoidance of implementations using expensive high accuracy clocks. When the recovered clocking signal experiences drift due to the arrival of a transient, the PLL 155 will not drift from the synchronized value immediately. When divergence is detected, in addition to the beat detector 156 triggering switch 164, a frequency hold can be asserted on PLL 155 so that its signal will be retained inside the acceptable bounds. When the recovered clocking signal drifts, the PLL 155 will not begin to drift immediately. The divergence in the output clocking signals of PLL 155 and demux 152 will be sufficient to trigger switch 164, and the PLL will maintain a frequency sufficiently close to the original value for a long enough duration to prevent the transmission of the transient.

One skilled in the art will appreciate that repeaters are typically used as bidirectional devices, with an on-ramp and off-ramp direction. In some implementations, a single PLL can be employed for the clock synchronization in both directions. If a fiber cut occurs and a transient is received from the on-ramp direction, the off ramp direction need not be perfectly accurate as its path has been severed and the data will not be received by the far end receiver (which would then be on the other side of a fiber cut).

The implementation of this solution can be done in any of a number of alternate embodiments using different structural elements to achieve the same results. A recovered clock signal and a generated clock signal (which may be generated in accordance with the recovered clock signal) are multiplied together, the multiplied signal, or components thereof, provides a rapid indication of divergence. The results are then preferably filtered and provided to a level detector. The detection of levels is preferably done with some degree of hysteresis to further filter noise and prevent false positives. If the frequency of detecting a change in levels of the multiplied signal is outside of a defined window, a switch is activated to change from the recovered clocking signal to the generated clocking signal.

Figure 4:
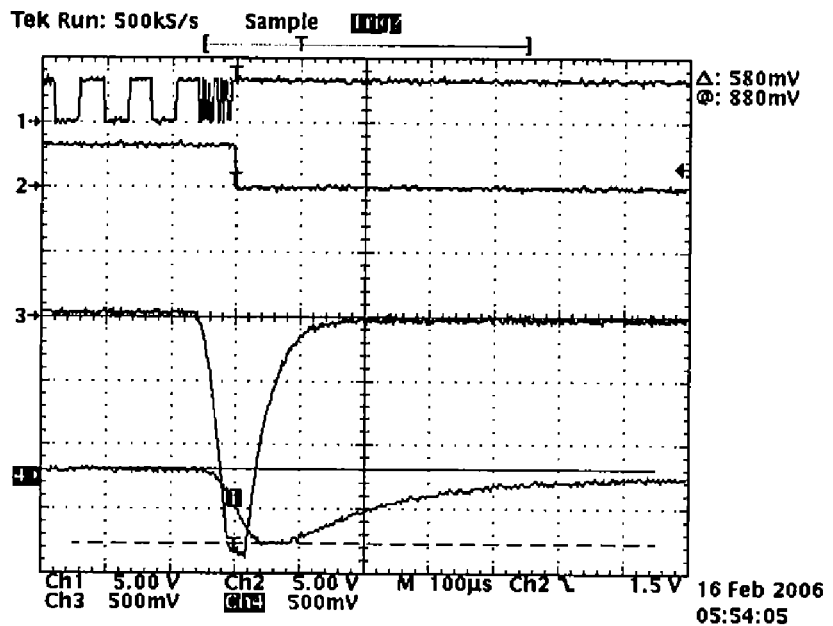
FIG. 4 is a graph illustrating the effect of loss of signal on various signals for a system with using a prior art loss of signal detection.

FIG. 4 illustrates the result of a loss of signal in an optical regenerator without the use of the beat detection providing clock switching. The first signal trace is the output of the Schmitt trigger which drives the pulse detect window. A constant low frequency beat is present because of an induced frequency offset between the reference and the recovered clock. The second signal trace is indicative of the loss of signal detected at the demultiplexer. The third and fourth traces indicate the clocking accuracy of the ingress and egress PLLs used for clocking. In advance of the demux signal indicating a loss of signal, a high beat frequency is present. This disruption results in the ingress Vtune signal (the third trace) diverging from a steady value maintained prior to the loss of service. The divergence of the ingress Vtune signal causes a similar divergence in the egress Vtune signal (the fourth trace). The timing in the egress Vtune signal is propagated downstream which results in the propagation of the timing transient.

Figure 5:
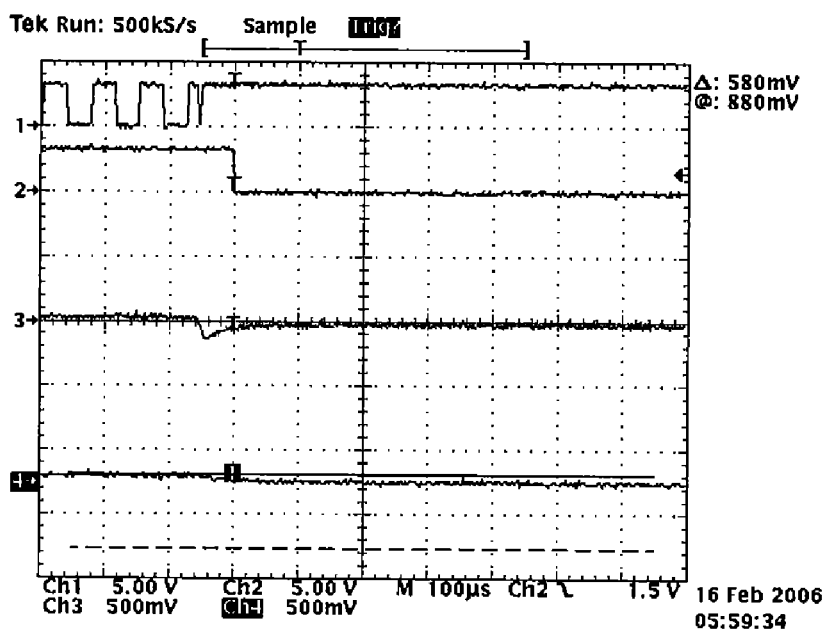
FIG. 5 is a graph illustrating the effect of loss of signal on various signals for a system using an embodiment of the present invention for loss of signal detection.

FIG. 5 illustrates the result of a loss of signal in an optical regenerator implementing an embodiment of the present invention. The signal traces in FIG. 5 correspond to those of FIG. 4. However, the beat detector's loss of signal is asserted as soon as a narrow pulse width in the first trace is detected. This action immediately forces a lock to reference clock. The demultiplexer's loss of signal indicator follows. However, in contrast to FIG. 4, the ingress Vtune divergence is much less pronounced because of the quick recognition. This results in stabilization of both the ingress and egress Vtune. A very controlled step response results on the egress Vtune. Thus, one skilled in the art will appreciate that implementation of a loss of beat detector of an embodiment of the present invention detects the loss of signal quickly enough to suppress the generation of timing transients.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An optical repeater for receiving an optical signal from an upstream node and for transmitting a regenerated copy of the received optical signal to a downstream node, the repeater comprising:
   an optical to electrical converter for generating an electrical domain signal in accordance with the received optical signal;
   a clock recovery device for recovering a clocking signal from the electrical domain signal;
   a framer for reframing the electrical domain signal in accordance with input and output domain clocking signals;
   an electrical to optical converter for converting the reframed electrical domain signal into an optical signal, and for transmitting the optical converted signal for a downstream node;
   a local clock for generating a local clocking signal;
   a beat detector having
      a multiplier for multiplying the recovered clock signal with the local clocking signal,
      a trigger for receiving the multiplied clock signals from the multiplier and for generating an output having first value when a component of the multiplied clock signals exceeds a threshold, and a second output value distinct from the first value when the component of the multiplied clock signal does not exceed a threshold, and
      a window detector for receiving the output of the trigger and for generating a signal indicative of drift in the recovered clock signal when the frequency in change between the first value and second value of the trigger is outside of a predefined window; and
   a switch for providing the framer with one of the recovered clocking signal and the local clocking signal as the input domain clocking signal in accordance with the signal indicative of drift.

2. The optical repeater of claim 1 wherein the optical signal is an optical pulse train.

3. The optical repeater of claim 1 wherein the clock recovery device is a demultiplexer for demultiplexing the electrical domain signal to recover the clocking signal and at least one data signal.

4. The optical repeater of claim 3 wherein the clocking signal is extracted from the at least one data signal.

5. The optical repeater of claim 4 wherein the clocking signal is extracted using edge detection.

6. The optical repeater of claim 3 further including a multiplexer for multiplexing the output of the framer and for providing the multiplexed output to the electrical to optical converter.

7. The optical repeater of claim 6 wherein the framer includes a phase detector for providing an output signal to an oscillator, the oscillator generating a clocking signal used by the multiplexer to create the multiplexed output.

8. The optical repeater of claim 7 wherein the output of the oscillator is provided as the output clocking signal to the framer.

9. The optical repeater of claim 1 wherein the local clock is a free running clock.

10. The optical repeater of claim 1 wherein the local clock is generated by a phase locked loop that receives the recovered clocking signal and generates the local clocking signal in accordance with the received recovered clocking signal.

11. The optical repeater of claim 10 wherein the phase locked loop is connected to a second optical repeater, the second optical repeater for transmitting a regenerated copy of received optical signals from downstream nodes to upstream nodes and using the phase locked loop output signal as a local clocking signal.

* * * * *